United States Patent [19]

Brem

[11] Patent Number: 4,642,499
[45] Date of Patent: Feb. 10, 1987

[54] CASING MEANS FOR ELECTRICAL MACHINE

[75] Inventor: Ernst Brem, Schlieren, Switzerland

[73] Assignee: BBC Brown, Boveri & Company, Limited, Baden, Switzerland

[21] Appl. No.: 766,344

[22] Filed: Aug. 16, 1985

[30] Foreign Application Priority Data

Sep. 14, 1984 [CH] Switzerland ......................... 4397/84

[51] Int. Cl.$^4$ ............................................. H02K 5/00
[52] U.S. Cl. ....................................... 310/89; 310/90; 310/91
[58] Field of Search ....................... 310/55, 42, 89, 90, 310/91, 258, 157; 277/89

[56] References Cited

U.S. PATENT DOCUMENTS

| | | | |
|---|---|---|---|
| 3,060,860 | 10/1962 | Schaefer | 310/90 |
| 3,375,382 | 3/1968 | Barber | 310/90 |
| 3,714,705 | 2/1973 | Lewis | 310/89 |
| 3,751,699 | 8/1973 | Gleichman | 310/90 |
| 3,916,233 | 10/1975 | Vockler | 310/89 |
| 3,916,671 | 11/1975 | Carson | 310/55 |
| 4,216,399 | 8/1980 | Bartheld | 310/89 |
| 4,450,373 | 5/1984 | Miller | 310/258 |
| 4,528,469 | 7/1985 | Prenner | 310/59 |

FOREIGN PATENT DOCUMENTS

| | | | |
|---|---|---|---|
| 1035256 | 6/1958 | Fed. Rep. of Germany | 310/89 |
| 1144383 | 2/1963 | Fed. Rep. of Germany | 310/55 |
| 2124929 | 11/1972 | Fed. Rep. of Germany | 310/89 |
| 2149972 | 4/1973 | Fed. Rep. of Germany | 310/89 |

OTHER PUBLICATIONS

ETG-Fachberichte 3, Kraftwerks-Generatoren" VDE-Verlag GmbH, Berlin, 1977, pp. 7-32.

Primary Examiner—R. Skudy
Attorney, Agent, or Firm—Oblon, Fisher, Spivak, McClelland & Maier

[57] ABSTRACT

In turbo-generators with hydrogen-cooled rotor windings, one-piece end casings are used to avoid complicated sealing positions. These end casings are strongly ribbed in a radial direction and present difficulties when installing the shaft seal (19). Furthermore, they do not permit any inspection openings in the ribbed end casing. Both have the final result of causing an increase in the machine length. Due to the pot-type design of the end casing (1) with a vertically extending channel-type recess (9) having a width greater than the rotor outer diameter, the assembly of the splert ring (19) is facilitated. The channel walls (7, 8) stiffen the end casing and provide niches which are accessible from the end face of the machine via inspection openings.

7 Claims, 5 Drawing Figures

CASING MEANS FOR ELECTRICAL MACHINE

FIELD OF THE INVENTION

The invention refers to an electrical machine having a hydrogen-cooled rotor, a stator, and an outer casing which surrounds the stator and has a gas-tight connection at each end with a one-piece ribbed end casing.

BACKGROUND OF THE INVENTION

In large electrical machines with a hydrogen-cooled rotor, the internal space of the machine casing must be hermetically sealed against the external conditions. This requires comprehensive arrangements both at the sealing points between the outer casing and the end casing and in the region of the shaft penetration. In addition, the end casing must be so designed that it withstands the internal pressure attained of up to 10 bar. The article "Turbogeneratoren (turbo-generators)", published in the "ETG-Fachberichte 3, Kraftwerks-Generatoren" VDE-Verlag GmbH, Berlin, 1977, pp. 7–32, provides a survey, which is still up to date, of the design of the casing/end casing of turbo-generators with gas cooled rotor windings. The one-piece (FIG. 23a on Page 29) or horizontally split (FIG. 19 on Page 28) end casing has a multiplicity of radially extending reinforcement ribs. The sealing between the outer casing and the end casing is, in fact, simpler in the case of one-piece end casings compared with horizontally split casings. Since, however, the shaft seal can only be fitted after the final installation of the rotor, the bearing blocks must be at a sufficient distance from the end casing for the shaft seal to be fitted. The increase in the length of the machine associated with this is, however, undesirable.

A further problem is presented by the access to the end parts of the stator. This access is at best provided — if at all — in the known machines by means of manholes in the outer casing, which increase the length of the machine, but not in the strongly ribbed end casings.

OBJECT OF THE INVENTION

On the basis of the known electrical machine with a one-piece end casing, the principal object of the invention is to so design the end casing that, on the one hand, it withstands the pressures occurring inside the casing but that, on the other hand, sufficient space remains for fitting of the shaft seal without increasing the distance between the bearings.

ADVANTAGES OF THE INVENTION

The invention has the following advantages relative to the known type of electrical machine:

the rotor can be moved in and out without dismantling the end casings, the two-part shaft seal can be lowered or raised from above or below, respectively, without special assembly arrangements, into the channel type recess and, because of the generous space available, the two part shaft seal can be installed in the rotor opening in the end casing.

A very stiff construction of the end casing is achieved which is as good as the one-piece radially ribbed end casing with respect to pressure loads and sealing and, in addition, permits a minimum bearing distance. The protrusions not only increase the stiffness of the end casing, but they also offer the possibility of providing inspection openings leading into assembly niches. From there, the machine winding and the rotor cap can be inspected without special effort.

BRIEF DESCRIPTION OF THE DRAWINGS

The invention is described in more detail below using the drawing, in which two embodiments are shown.

FIG. 2 is a horizontal section through the end of the outer casing and the end casing according to FIG. 1 along the line II—II in that figure a.

DETAILED DESCRIPTION OF THE PRESENTLY PREFERRED EMBODIMENTS

Figure 1:
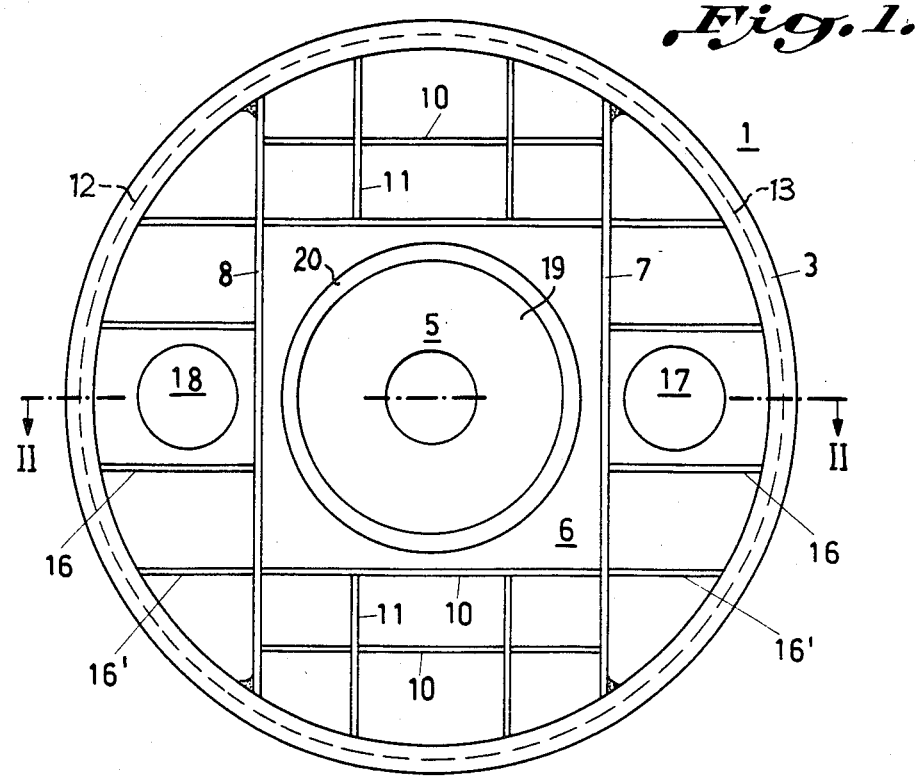
FIG. 1 is a view onto the rear side (i.e. from the inside) of an end casing of an electrical machine.
Figure 2:
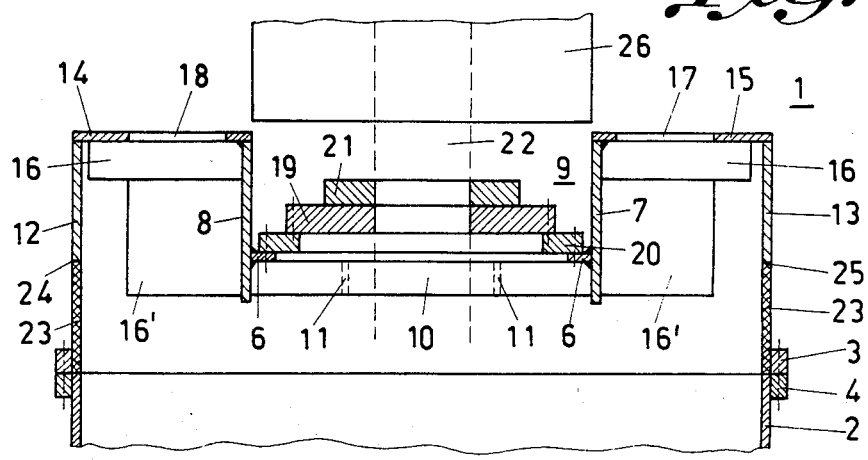
Figure 3:
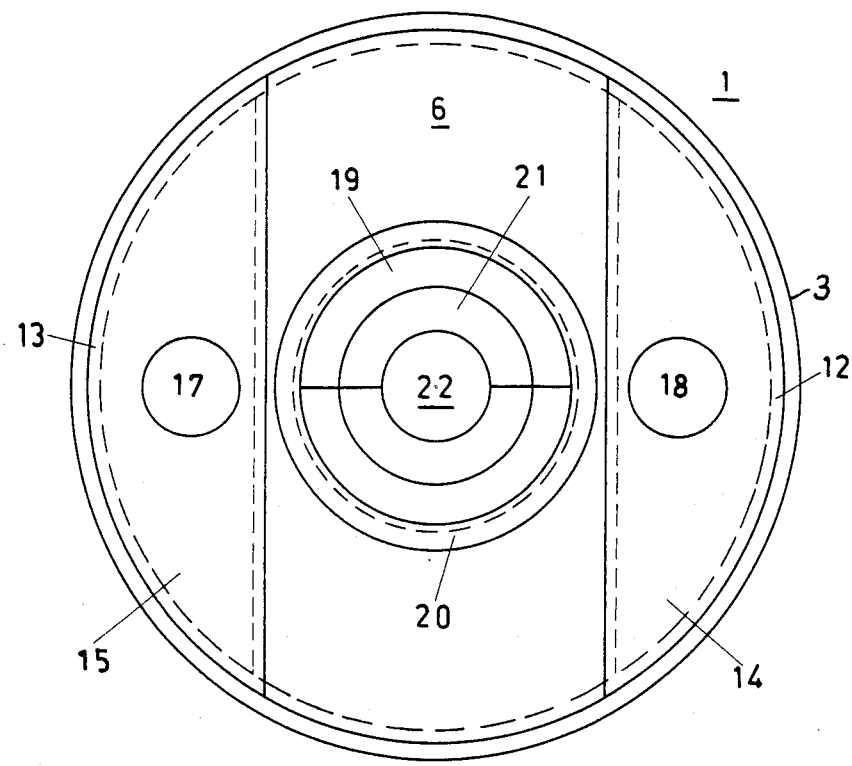
FIG. 3 is a view onto the front side (i.e. from the outside) of the end casing according to FIGS. 1 and 2.

In FIGS. 1 to 3, a pot-shaped end casing is indicated in total by 1 and an outer casing by 2. The outer casing 2 and the end casing 2 are bolted together by means of annular flanges 3, 4. The end casing 1 has a central hole 5 whose diameter is only slightly greater than the maximum outer diameter of the rotor but large enough for the machine rotor to be removed from the machine without dismantling the end casing 1.

The end casing 1 consists of a first flat metal plate 6 whose width is only slightly greater than the diameter of the hole 5. As best seen in FIG. 3, the first flat metal plate has a first straight edge, a second straight edge, a first arcuate edge, and a second arcuate edge. The first and second straight edges extend vertically when the electrical machine is in use, and the first and second arcuate edges are between the first and second straight edges at the top and the bottom of the electrical machine, respectively. It extends over the total height of the end casing. A second metal plate 7 and a third metal plate 8 are welded at right angles to the metal plate 6. The metal plates 7 and 8 also extend over the total height of the end casing and act as stiffening ribs. The second and third flat plates 7 and 8 each have an axially inner edge and an axially outer edge. The vertically extending rectangular cross-section recess so formed is indicated by 9. Horizontally and vertically extending stiffening ribs 10 and 11 are welded below and above the hole 5 on the inside of the flat metal plate 6 in the form of a lattice.

A part-cylindrical forth metal plate 12 and a part-cylindrical fifth metal plate 13, both of which are curved to correspond to the outer contour of the outer casing 2 (which curved metal plates are welded on their insides to the second and third metal plates 7 and 8, respectively), form — together with the metal plates 7 and 8 — cylindrical segment or half-moon shaped recesses or niches. These are closed at their ends by flat arc-shaped covers 14, 15. The first and second flat, arc-shaped covers are both disposed perpendicularly to the rotor shaft 22. The first flat, arc-shaped cover 15 has an arcuate edge and a straight edge. The straight edge of the first flat, arc-shaped cover 15 is joined to the axially outer edge of the second flat plate 7. The second flat, arc-shaped cover 14 has an arcuate edge and a straight edge. The straight edge of the second flat, arc-shaped cover 14 is joined to the axially outer edge of the third flat plate 8. These recesses/niches are also stiffened by horizontally extending ribs 16, 16' in the inside.

Two inspection openings 17, 18, which provide access to the niches, are provided in the covers 14, 15 approximately at the height of the central hole 5. The inspection openings 17, 18 (manholes) are normally closed by covers (not shown).

The two bottom stiffening ribs 16' are axially longer than the other ribs 16 and provide a standing surface for the inspection personnel.

From FIG. 2 can also be seen the position of the shaft seal which is shown, in a simplified manner, as a split ring 19 which is fastened to the end casing 1, with a split intermediate ring 20 inserted between the split ring 19 and the first flat metal plate 6. The split ring 19 and the split intermediate ring 20 provide hermetic sealing of the machine casing (subject to $H_2$ pressure during operation) against the external conditions at the penetration of a rotor shaft 22. A two-part oil wiper 21 is also part of the shaft seal.

It is obvious that all the sealing positions, for example between the outer casing 2 and the end casing 1, are provided with appropriate seals, for example O-rings placed in grooves.

It is, of course, possible to apply the annular flange 3 of the end casing 1 directly to the flat plate 6 and curved plates 12 and 13 — i.e. to weld it to these plates. Depending on the axial length of the outer casing 2 and the overhang of the winding heads, and on the space requirements of the pressure generator, it can be necessary to provide a distance between the flat plate 6 (and therefore also the niches) and the end of the outer casing 2. A distance tube 23 with the external contour of the outer casing 2 is used for this purpose. The distance tube 23 carries the annular flange 3 at its end facing towards the outer casing 2. At its other end, the distance tube 23 is welded to the flat plate 6 and to the two curved plates 12 and 13. The weld seams between the part cylindrical plates 12 and 13 and the distance tube 23 are indicated by the reference FIGS. 24 and 25, respectively, in FIG. 2. The curved plates 12 and 13 can, however, also be designed in one piece with the distance tube 23, which substantially simplifies the manufacture of the total end casing.

Figure 4:
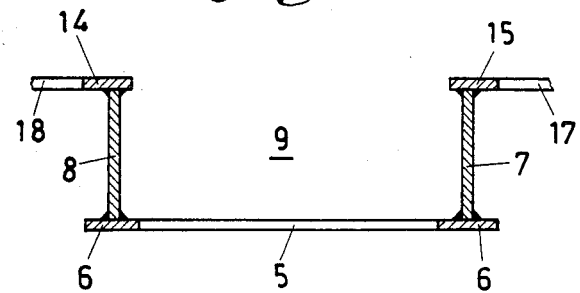
FIG. 4 shows a variation of FIG. 2 with vertical ribs in the form of double T or I beams.
Figure 5:
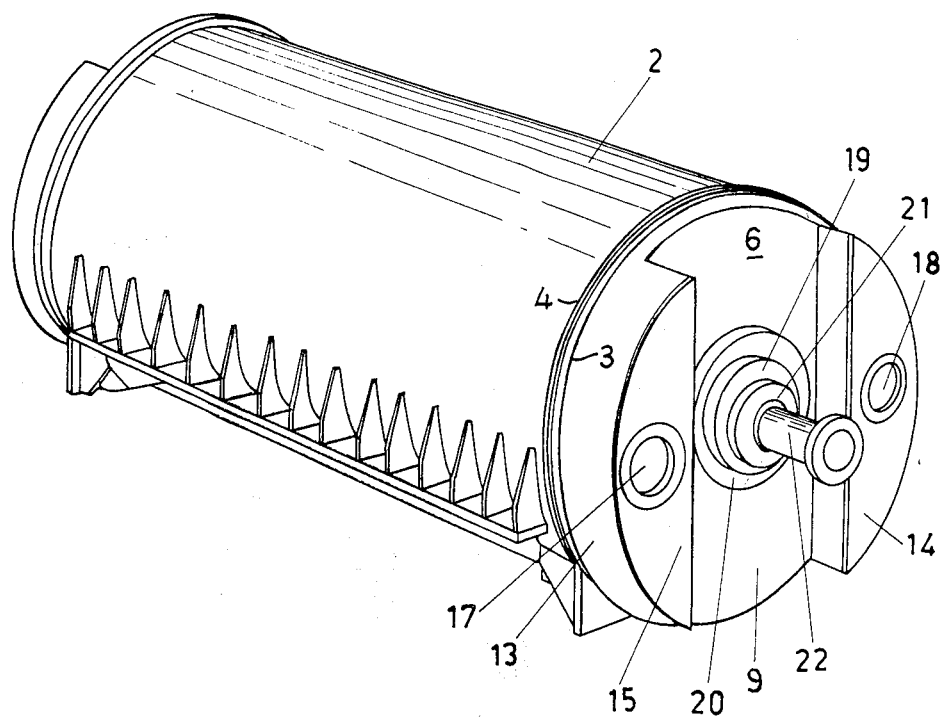
FIG. 5 is a perspective view of an electrical machine with end casings according to FIG. 1.

The variant shown in FIG. 4 of the design embodiment of the transition point from the covers 14, 15 to the flat plate 6 makes possible an even stiffer design of the end casing 1 without any increased technical effort in manufacture. Relative to FIG. 2, the covers 14, 15 are increased on the inside, and the flat plate 6 is increased on the outside by a protruding part. The metal plates 7 and 8 are welded between the flat metal pate 6 and the covers 14, 15, respectively. The ends of the flat plate 6 and the covers 14, 15, together with the metal plates 7 and 8, form — in this manner — a stiffening element in the type of a double T or I beam, which penetrates the end casing on both sides of the central hole 5 and decisively stiffens the end casing 1 without restricting the recess 9 for the accommodation/fitting of the shaft seal.

A common feature of both embodiments is that, with the rotor moved into position, there is sufficient space between a bearing block 26 (shown only in FIG. 2) and the face of the end casing 1 for assembly and service purposes. Furthermore the bearing blocks 26 can be moved as close as possible or necessary to the end face of the machine.

The side niches stiffen the end casing 1 and, in addition, provide access to the winding head space from the end face of the machine without the end casing 1 being dismantled. All the sealing positions are uncomplicated — no T-joints as in the case of machines with horizontally split end casings.

I claim:

1. An electrical machine comprising:
   (a) an outer casing, said outer casing being at least generally cylindrical in shape;
   (b) a rotor shaft disposed axially in said outer casing, a first end of said rotor shaft projecting outwardly from said outer casing;
   (c) a bearing block journalling the first end of said rotor shaft; and
   (d) an end casing fastened to said outer casing, said end casing comprising:
   (i) a first flat plate disposed perpendicularly to said rotor shaft, said first flat plate extending vertically when said electrical machine is in use, said first flat plate having a central hole sized and shaped to permit a rotor mounted on said rotor shaft to be removed axially from said outer casing without dismantling said end casing from said outer casing, said first flat plate having a first straight edge, a second straight edge, a first arcuate edge, and a second arcuate edge, said first and second straight edges extending vertically when said electrical machine is in use and said first and second arcuate edges being between said first and second straight edges at the top and the bottom of said electrical machine, respectively;
   (ii) a second flat plate and a third flat plate, both said second and third flat plates being disposed perpendicularly to said first flat plate, said second flat plate being joined to said first straight edge of said first flat plate and said third flat plate being joined to said second straight edge of said first flat plate, said second and third flat plates each having an axially inner edge and an axially outer edge;
   (iii) a first flat, arc-shaped cover and a second flat, arc-shaped cover, both said first and said second flat, arc-shaped covers being disposed perpendicularly to said rotor shaft, said first flat, arc-shaped cover having an arcuate edge and a straight edge, the straight edge of said first flat, arc-shaped cover being joined to the axially outer edge of said second flat plate and said second flat, arc-shaped cover having an arcuate edge and a straight edge, the straight edge of said second flat, arc-shaped cover being joined to the axially outer edge of said third flat plate;
   (iv) a first part-cylindrical plate and a second part-cylindrical plate, said first and second part-cylindrical plates each having an axially inner edge and an axially outer edge, said axially inner edges of said first and second part-cylindrical plates being joined to said outer casing, aid axially outer edge of said first part-cylindrical plate being joined to the arcuate edge of said first flat, arc-shaped cover, and said axially outer edge of said second part-cylindrical plate being joined to the arcuate edge of said second flat, arc-shaped cover; and
   (v) an inspection opening located in at least one of said first and second flat, arc-shaped covers.

2. An electrical machine as recited in claim 1 and further comprising a shaft seal mounted on said first flat plate for hermetically sealing said electrical machine.

3. An electrical machine as recited in claim 1 and further comprising:
   (a) a plurality of stiffening ribs extending between said second flat plate and said second part-cylindrical plate and
   (b) a plurality of stiffening ribs extending between said third flat plate and said first part-cylindrical plate.

4. An electrical machine as recited in claim 3 wherein one of said plurality of stiffening ribs is sized, shaped, and positioned to provide a standing surface for inspection personnel looking through said inspection opening.

5. An electrical machine as recited in claim 1 wherein an inspection opening is located in each of said first and second flat, arc-shaped covers.

6. An electrical machine as recited in claim 1 wherein the axially inner ends of said second and third flat plates abut against the axially outer surface of said first flat plate.

7. An electrical machine as recited in claim 1 wherein said first and second straight edges of said first flat plate abut against the radially inner surfaces of said second and third flat plates, respectively.

* * * * *